(No Model.) 3 Sheets—Sheet 2.
S. ARONSON.
VOTING MACHINE.
No. 566,439. Patented Aug. 25, 1896.
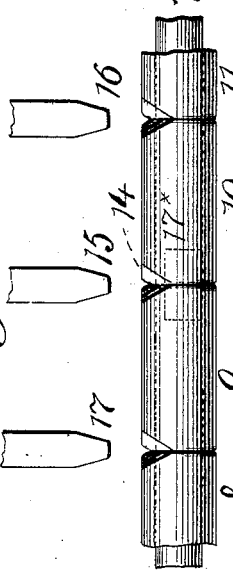
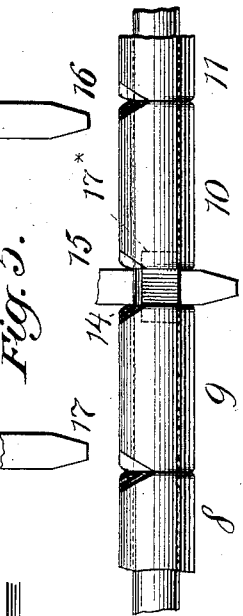
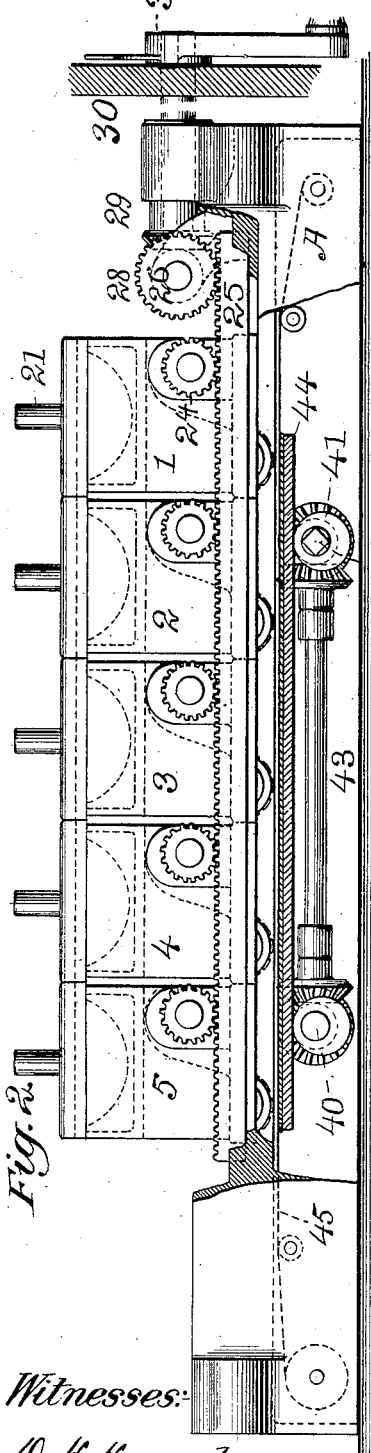
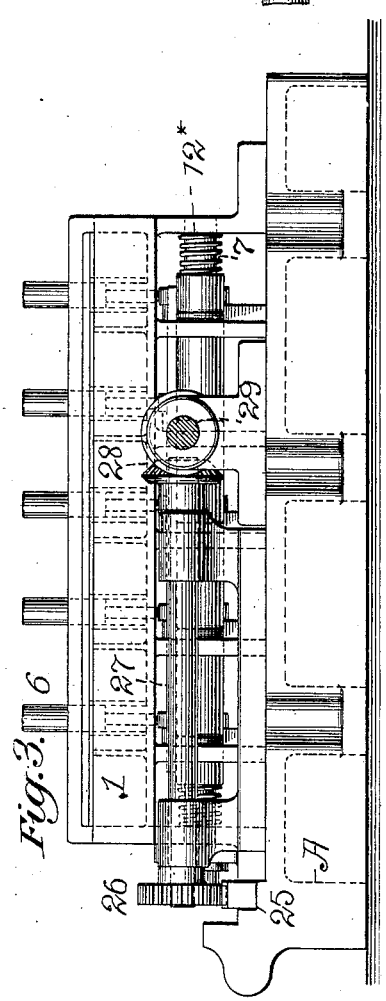
Witnesses:
D. H. Hayford
H. R. Mollen
Inventor:—
Saul Aronson
by
Parks Benjamin
his attorney.

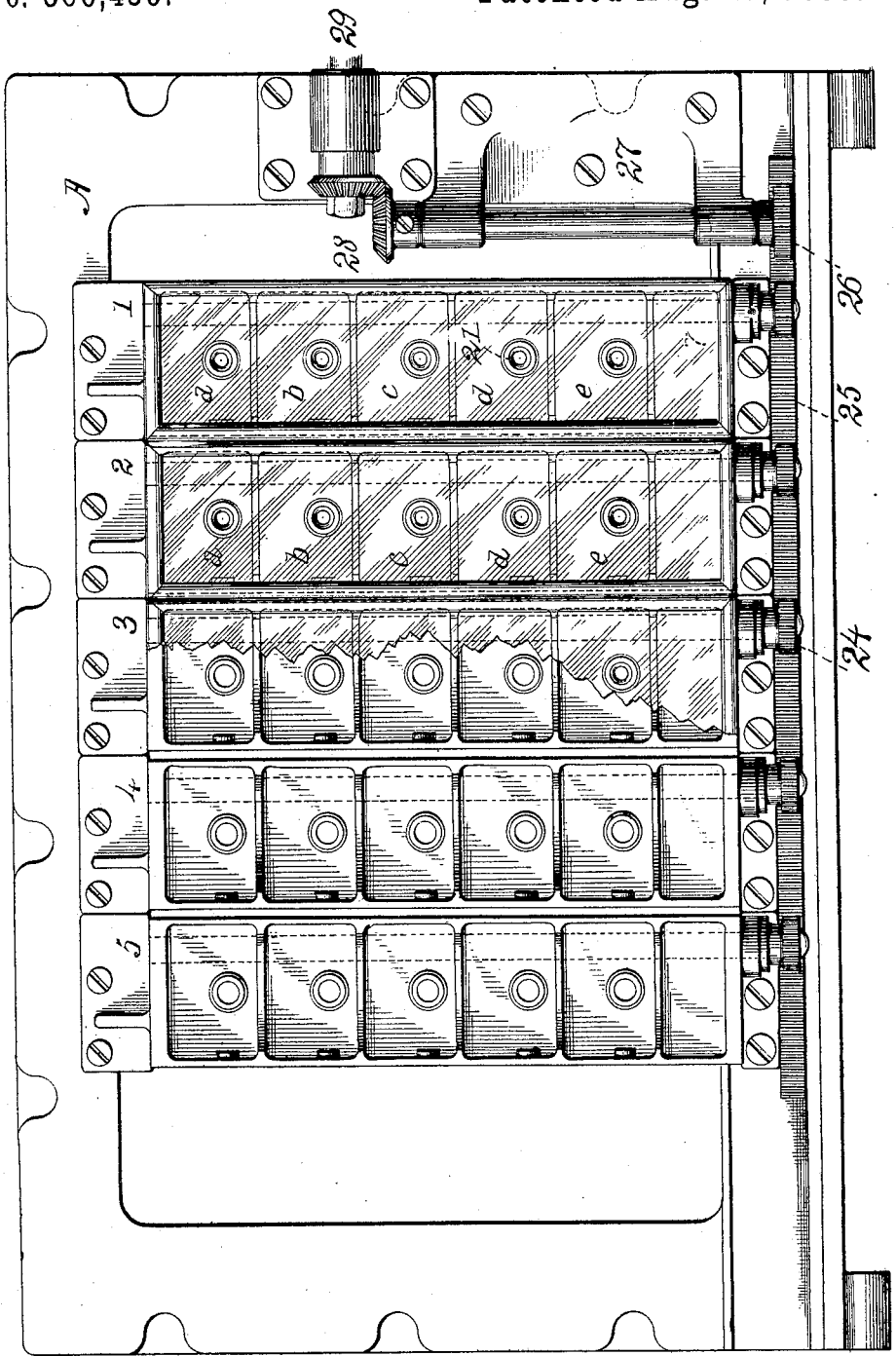

(No Model.) 3 Sheets—Sheet 3.
S. ARONSON.
VOTING MACHINE.
No. 566,439. Patented Aug. 25, 1896.
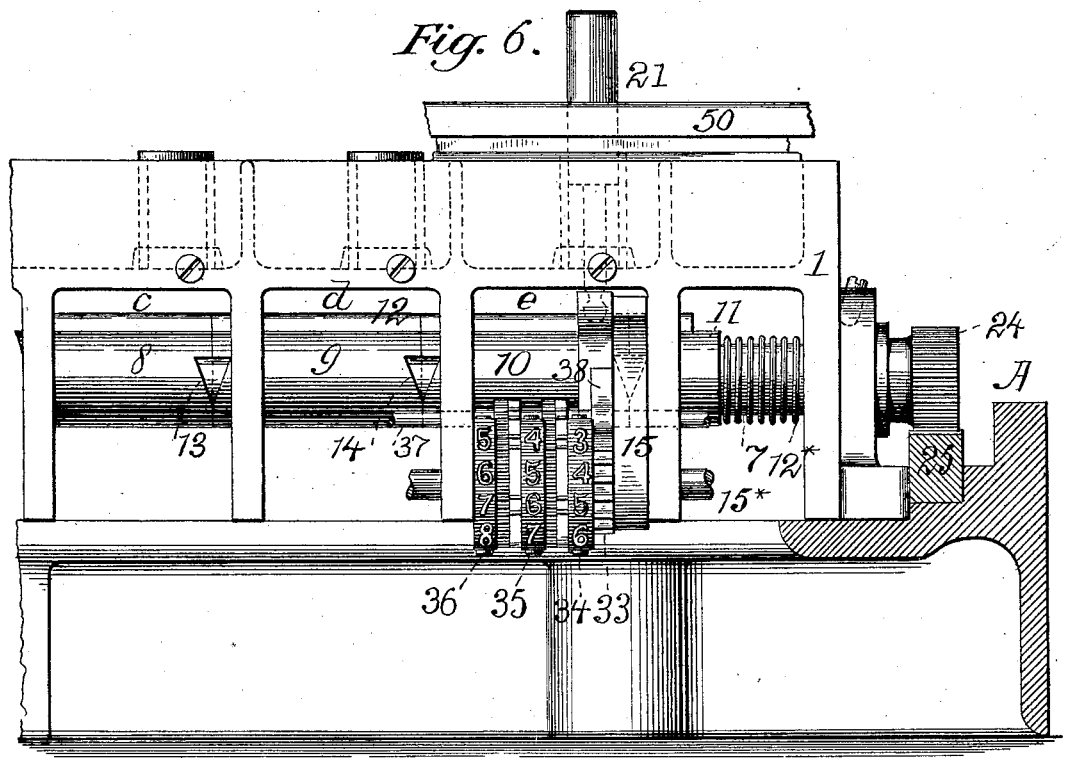
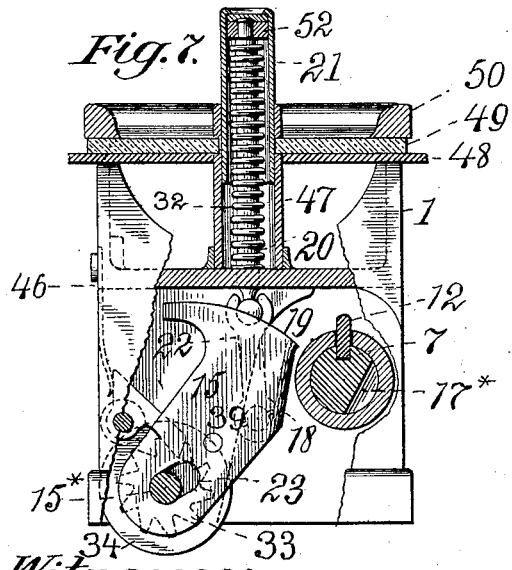
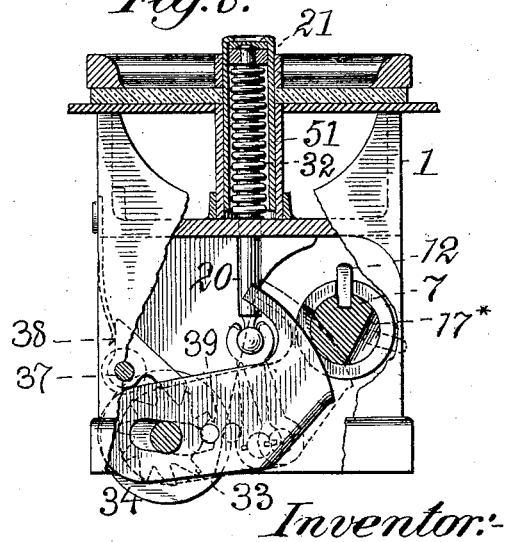
Witnesses:
D. H. Hayford
H. R. Moller
Inventor:-
Saul Aronson
by Park Benjamin
his attorney.

UNITED STATES PATENT OFFICE.

SAUL ARONSON, OF BROOKLYN, NEW YORK, ASSIGNOR OF ONE-HALF TO FRANK LAMBERT, OF SAME PLACE.

VOTING-MACHINE.

SPECIFICATION forming part of Letters Patent No. 566,439, dated August 25, 1896.

Application filed May 21, 1895. Serial No. 550,063. (No model.)

*To all whom it may concern:*

Be it known that I, SAUL ARONSON, of Brooklyn, Kings county, New York, have invented a new and useful Improvement in Voting-Machines, of which the following is a specification.

The object of the invention is to provide means for mechanically registering and recording votes given at an election which shall be operated by the voter himself, thus doing away with all of the contrivances and processes incident to the deposit and canvassing of votes cast by ballot. The construction is such as to require from the voter the minimum of intellectual and physical effort, while at the same time completely preventing any misdirection or wrongful application thereof. The voter, on entering a voting closet or booth, is confronted with a number of press-buttons, each labeled with the name of a candidate. He indicates his choice and registers his vote by pressing the buttons bearing the names which he prefers. If he attempts to repeat or to vote improperly he is unable to operate the mechanism. His legal vote is added to the total of votes cast and shown by an indicating, registering, or recording mechanism, and afterward the apparatus is returned to its normal condition by an attendant, thus making it ready for use by another voter.

The unit of the apparatus, which is repeated in it as many times as circumstances may require, is a cell or compartment containing devices which actuate an indicating, registering, or recording, and also an associated locking or catching, mechanism, which devices are operated by a press-button provided for that purpose. Each cell corresponds to a candidate to be voted for, and therefore there will be as many cells as there are candidates. The grouping of the cells will depend upon the nature of the election. Thus there will be as many groups of cells as there are contesting parties and as many cells in each group as there are offices to be filled. The principle of the organization, then, is to organize and construct the mechanism in these cells so that the voter may register one vote for each office, for which purpose he may actuate the mechanisms of the proper cells in any group; but, on the other hand, the construction and organization is, further, to be such that the fact of his having actuated the mechanism of a cell in one group makes it impossible for him to actuate the corresponding cell mechanism in another group. Thus, to illustrate, there may be three groups of cells—one group devoted to the Republican, the second to the Democratic, and the third to the Populist ticket. In each group the cells correspond to the offices, of which there may be, for example, three—say governor, mayor, and sheriff. Now the construction is such that while the voter may register his vote for the nominee of any of the three parties—as, for example, the Republican governor, or the Democratic governor, or the Populist governor—the very fact of his voting for the chosen candidate prevents his voting for either of the other two named for the same office. Consequently, while the voter's choice of party and nominee is entirely unrestricted, he is debarred from voting for more than one candidate for each office. So, also, it is impossible for him to vote for the same candidate more than once.

In the accompanying drawings, Figure 1 is a plan or face view of the apparatus. Fig. 2 is a longitudinal edge view. Fig. 3 is a side view taken from the right-hand side of Fig. 1. Figs. 4 and 5 are illustrative figures intended to exhibit the operation of the locking device. Fig. 6 is an enlarged detail view in partial section and taken from the left of Fig. 1. Figs. 7 and 8 represent the details of the locking mechanism in side elevation and in two positions.

Similar numbers and letters of reference indicate like parts.

I will first describe certain general features.

The apparatus is supported upon a metal frame A, Fig. 1, which may rest horizontally upon a table within the voting closet or booth. Upon the frame A are secured smaller metal frames, as 1 2 3, &c., each of which is divided by transverse partitions into a number of cells or compartments, as *a b c d e*. Of course the frame A can be of any desired size and may carry as many smaller frames 1 2 3, &c., as required, and each smaller frame may be subdivided into any number of compartments or cells. This will depend upon the peculiar characteristics of the election in which the machine is used. Thus, to illustrate, frame 1 may be devoted to all the candidates for a given office—say governor—each candidate being represented by one compartment, as *a b c*, &c. Frame 2 may be devoted to all the candidates for another office—say mayor—each candidate, as before, being represented by a compartment. The candidates' names are placed in the same order in each frame, so that in all the *a* compartments may appear the nominees of a certain political party, in all the *b* compartments the nominees of another party, and so on. Therefore the voter selects his candidate, say for governor, from frame 1, for mayor from frame 2, and if he prefers a Republican governor he selects compartment *a* of frame 1, or if a Democratic governor he chooses compartment *b* of frame 1, and so on. The grouping of the cells for parties is therefore shown in the apparatus of the drawings as arranged longitudinally frame A and their grouping for candidates as arranged transversely frame A. Of course this is arbitrary and can be modified as desired.

I will now describe how the vote is limited to a selection of the proper number of candidates. The voter makes his selection by pressing inward a press-button, as 21, and with such a press-button each compartment or cell is provided. As each frame, as 1 2 3, &c., with its associated mechanism, is the counterpart of the other, a description of one will suffice for all. Taking, therefore, frame 1, 7 is a shaft extending through all the cells *a b c*, &c. It is capable of rotation, for which purpose mechanism is provided, but description of this feature of it is best deferred for the present. Upon the shaft 7 is a number of loose sleeves 8 9 10 11, which abut. They are prevented from turning by a feather 12, which enters a longitudinal groove in the shaft. Between the extremities of the outermost sleeves and the end walls of the frame 1 are coiled springs 12*, which press the several sleeves together and oppose an elastic resistance to their being forced asunder.

Reference to Fig. 6 will show that in every compartment, as *a b c*, &c., comes the adjacent ends of a pair of sleeves—as of sleeves 8 and 9 in compartment *c*, 9 and 10 in compartment *d*, and so on. It will also be seen that in the adjacent ends of each pair of sleeves, as aforesaid, is formed a wedge-shaped recess, as 13 between sleeves 8 and 9 and 14 between sleeves 9 and 10. The object of this recess is to allow of the insertion of a dog, by means of which the sleeves may be forced asunder, and the effect and purpose of that operation will be best understood from the illustrative drawings, Figs. 4 and 5.

In Fig. 4 I show the sleeves 8 9 10 11 in close juxtaposition on the shaft 7, being so held, as already explained, by the coiled springs 12*. At 17, 15, and 16 I have represented wedge-shaped dogs, which (it may be supposed) may move toward the shaft 7 and enter between the sleeves. Now it is clear from Fig. 5 that when the dog 15, for example, enters between the abutting ends of sleeves 9 and 10 these sleeves will thereby be forced asunder and will slide in opposite directions on the shaft 7. In sliding they will of course displace all the other sleeves, so that while in the beginning, Fig. 4, any dog, as 17, 15, or 16, may enter between the ends of the pairs of sleeves in front of it, after a dog has so forced itself between a pair of sleeves and so moved all the sleeves no other dog can be inserted at any junction-point, because, as Fig. 5 plainly shows, the junctions have moved away from in front of the dogs, so that the latter, if carried toward shaft 7, simply encounter the solid metal of the sleeves.

Now, returning to Figs. 1 and 6, if in every cell in frame 1 there is such a sleeve-junction, and also in every cell a dog actuated by the press-button belonging to that cell, and so forced into said junction, manifestly as soon as the button of one compartment in the frame has been pressed and the dog therein inserted between the sleeves to move them apart then every other sleeve-junction in every other compartment in that frame will be displaced and it will be impossible to insert any other dog in any other junction, or, as will hereinafter appear, to push in any other press-button. If, therefore, as I have said, the several compartments or cells of frame 1 correspond to the several nominees for one office, then clearly the voter in operating the button and dog of one compartment by that act forces the sleeve-junctions in all the other compartments out of line with the dogs therein, and, as a consequence, prevents himself from operating a second button, or, in other words, from voting for two candidates for the same office.

I will now describe the mechanism which prevents "repeating" or voting for the same candidate a second time; and to this end, clearly, the mechanism operated by the voter must lock itself automatically as soon as actuated.

I may now refer to the detail of the instrumentalities which are in each cell, and as these in each cell are the counterpart of those in every other cell it is necessary simply to describe the construction for one cell. Turning to Figs. 7 and 8, within the cell there is pivoted a dog 15, having a wedge-shaped front edge at 18 and a rounded upper edge at 19.

This dog is connected to the rod 20 of the press-button 21 (the details of which I will explain hereinafter) by a link 22. The pivot-opening 23 in the dog is elongated, so the dog has some forward-and-backward play on its pivot. The edge 18 of the dog comes directly opposite the junction of the sleeves which abut in that cell, so when the dog is swung downward on its pivot by the action of the link 22, moved by pressing in the press-button 21, its said edge 18 will enter the recess, as 14, between said sleeves and force said sleeves apart in the manner already described, and as the downward movement of the dog continues its rounded upper edge 19 will bear against the shaft 7. The dog is thus moved bodily rearward as well as downward; or, in other words, because it is provided with the elongated slot 23, it slides upon its pivot 15*, so that a pin 39, which is upon said dog, becomes engaged with the ratchet 33. The continued downward movement of the dog now causes the ratchet-wheel to be turned forward one tooth. When the dog reaches the end of its downward motion, it is in the position shown in Fig. 8; or, in other words, it is locked between shaft 7 and pivot 15*. The pin 39 cannot now turn the ratchet-wheel 33 backward because of the engagement of the pawl 38 with said wheel. The ratchet-wheel 33 is loose on pivot-shaft 15* and operates the registering (or recording) mechanism as hereinafter explained. The dog 15 being thus locked in downward position, of course, through the link connection 22, holds the press-button 21 as pushed in. Therefore the voter cannot operate that button a second time; nor can the mechanism, as now placed, be used again in the same way by any one until it has been reset in its original position.

Having now described the mechanism whereby the voter is permitted to vote for but one candidate for a given office and to register but one vote for that candidate, I will now describe the resetting mechanism whereby the parts last described are brought back to their original position. The shaft 7, as I have stated, extends through all of the compartments a b c d, &c., of a frame, as 1. At certain points along its length — namely, wherever the junctions of the sleeves upon it normally come—said shaft is mutilated, as shown at 17* in Figs. 4, 5, 7, and 8. On the extremity of shaft 7 is a pinion 24, which engages with a rack 25, which slides in a groove in the main frame A. The rack 25 is caused to slide to and fro by the pinion 26, carried by the shaft 27, which, by bevel-gear 28, receives its motion from the shaft 29. The shaft 29 extends through the wall 30 of the closet or booth in which the apparatus is located, and is provided with a crank-handle 31, Fig. 2, by means of which it is turned as may be necessary by an election inspector or other official in charge.

The operation of this part of the machine is very simple. The voter, as I have stated, after pressing down a button brings the mechanism into the position shown in Fig. 8, where it is locked. In order to release it and so arrange it again for use, the official in charge turns the crank 31, thereby rotating shaft 7 until the mutilated part 17* comes opposite the dog 15, when the latter is free to be raised by the action of the retracting-spring 32 of the press-button. The shaft 7 is then turned back and all of the parts assume their original position, as shown in Fig. 7. As all of the shafts 7 in the several frames 1 2 3, &c., are geared in the manner described to the sliding rack 25, it follows that all are operated simultaneously by the crank 31, so that a single movement of the latter, after one voter has left the booth, resets the whole machine for the next voter.

I will now describe the construction of the recording mechanism.

Loose on the pivot-shaft 15* of dog 15 is mounted a ratchet 33, which is integral with a disk 34, which has raised numbers on its periphery; also upon said shaft are other printing-wheels 35 and 36, with intermediate gearing, part of which is carried on the fixed shaft 37, which also supports the pawl 38, which engages with the ratchet 33. The relation of the printing-wheels 34, 35, and 36, through their intermediate gearing, is such that ten revolutions of wheel 34 cause one revolution of wheel 35 and ten revolutions of wheel 35 one revolution of wheel 36. As such arrangements of printing and numbering wheels are very well known—and there are many modifications of them—it is not necessary to explain in detail the specific mechanism whereby the said wheels in the present apparatus are caused to transmit motion one to the other. Initial motion is given to the first wheel 34 of the train by means of a pin 39 upon the side of the dog 15, which, as already explained, when the dog is moved downward engages with the ratchet 33 and moves it forward one tooth. As the teeth on ratchet 33 correspond to the raised numbers on wheel 34, it follows that at each operation of the press-button—or, in other words, at each vote—the registering mechanism is advanced one number, and in this way the total number of times the button is pressed or the total number of votes cast for the candidate represented by that button is thus registered.

While I may use the counting mechanism, as above described, simply as a registering or indicating mechanism, I prefer to combine with it means whereby it may operate as a recording mechanism to print the tally of the vote upon a suitable slip. I have illustrated an arrangement whereby this may be accomplished in Fig. 2.

In the lower portion of frame A may be journaled two shafts 40 and 41, one of which has a squared end 42, to which a crank-handle may be applied. Motion is communicated to shaft 41 and therefrom by the shaft 43 and bevel-gearing shown to the shaft 40. On the shafts 40 and 41 are eccentrics, (at their middle portions,) and upon them rests a platen 44. In the frame of the machine may be arranged rolls for carrying a continuous tally-sheet 45 and a carbon sheet above it, the said sheets extending under the type-wheels 34, &c., and above the platen 44.

After the voting has concluded the official in charge of the machine turns the crank applied to shaft 41 and thereby operates both shafts 41 and 40 to cause the eccentrics to lift the platen 44. In this way the tally and carbon sheets are pressed against all the type-wheels and an imprint of all the registers produced on the tally-sheet. By this means the number of votes cast for each candidate is instantly secured as soon as the voting is over, and the tally-sheet so obtained may be used as the official poll-return. It is of course to be understood that I do not limit myself to this particular mode or mechanism for obtaining a record from the register or type wheels, the present construction being typical and capable of variation in many ways.

The arrangement of the press-buttons will be readily understood from Figs. 7 and 8. Each compartment has a horizontal partition 46, which carries the tubular standard 47, upon which is supported a name-plate 48, glass cover 49, and outer frame 50. In the standard 47 is a tube 21, closed at its upper end and receiving the rod 20, the lower end of which is connected by a ball-and-socket joint to the link 22. Surrounding the rod 20 and disposed within the tube 21 is the helical spring 32, which is secured at one end to a plug 52, and bears at its other end the partition 46. The effect of this spring is normally to hold the button (the tube 21) in elevated position, as shown in Fig. 7, and also to retract the dog 15 when released from engagement with the shaft in the manner already described.

Referring now more particularly to the coaction of the dog 15 and the sleeves, such as 9 and 10, having the wedge-shaped recess 14, it will be seen from Figs. 4, 5, and 6 that the abutting ends of said sleeves fit closely together, and that the face or edge of the dog which enters the triangular or wedge-shaped recess 14 is made of such breadth that while it can readily insert itself in the widest part of said recess it cannot force itself between the ends of the sleeves anywhere else, this because of the close fitting together of said ends. Therefore the dog cannot act to force the sleeves asunder unless the shaft 7 be so turned as to bring the recess 14 in proper position before it, and, of course, when it cannot separate said sleeves they act as a barrier, effectually preventing its further movement and consequent actuation of the recording mechanism. The advantage of this construction is that there is only one position of the shaft in which the dog can operate. It is true that the dog is between the sleeves in Fig. 8 and remains so while that shaft is turned to the right, so as to bring the mutilated part 17* in front of the dog, so as to enable the latter to be retracted by its spring; but this rotation of the shaft moves the recess 14 away from the position in which it registers with the dog, so that the dog now lies between the straight facing ends of the sleeves. Therefore when the dog is raised these straight facing ends at once come together, and consequently any attempt to push the dog down again is immediately frustrated, and in fact the shaft 7 must be turned back to the position of Fig. 7—that is, with the recess 14 in position in front of the dog—before the dog can be again worked. It will be seen, therefore, that the act of releasing the dog from its locked position does not in any wise make it possible to effectively operate the dog a second time. Therefore any possibility of repeating through collusion between a voter and the official in charge of the crank 31 is prevented.

The operation of the entire machine may now be recapitulated.

The voter, entering the booth or closet, presses in the buttons labeled with the names of the candidates for whom he desires to vote. By this means he locks in place the buttons which he has selected, so that he cannot repeat the vote, and he also adjusts the mechanism so that he can vote for no other candidates for the same office than those which he has already chosen; also by the same means he moves all the type or register wheels one number ahead, thus increasing the register of votes by one. He then leaves the booth. The official in charge then manipulates the crank 31 to release all the dogs which have been pressed down, thus returning the machine to its normal condition, ready for the next voter. At the end of the voting or at any time during its progress, as desired, the official in charge may operate the platen mechanism to move the tally-sheet into contact with the under sides of the type-wheels, thus obtaining thereon an impression which gives an exact record of all the votes cast for each candidate.

Referring now more particularly to Figs. 7 and 8, it will be seen that the feather 12 projects considerably beyond the periphery of the sleeves 8 9, &c., on the shaft 7. The object of this construction is to afford a convenient and simple way of locking the entire apparatus, so that it cannot be tampered with after the whole voting thereon has concluded. This is effected in the following manner: When the shaft 7, Fig. 7, is turned to the left, the feather 12 strikes against the curved part 19 of the dog 15 and pushes said dog rearwardly, the dog then sliding on its pivot until the pin 39 on said dog enters between the ratchet-teeth. Thus the dog becomes locked in place, although in an upright position, and cannot be released until the shaft 7 is turned to the right. It will be seen, therefore, that after the voting on the machine has concluded (when all of the several registering or recording wheels will show a certain number) the shaft 7 may be turned and all the mechanism locked and thus held in position for any desired time.

In the following claims wherever I refer to a contrivance such as a lever or rod for actuating the mechanism within the cell I mean any device whereby physical force exerted by the user is transmitted from him to the mechanism which it is necessary for him to operate in order to produce the desired results; also, in each of the following claims where I have used the term "indicating, registering, or recording mechanism" and subsequently in the same claim used the term "registering mechanism" it is to be understood I employ the term "registering mechanism" for brevity only, and desire it to be understood in such claim as "indicating, registering, or recording mechanism."

Wherever the term "registering mechanism" is used in the following claims, it is to be understood that I include therein and as practical equivalents thereof "indicating or recording mechanism."

I claim—

1. In a voting-machine a compartment, a registering mechanism therein, a rod constructed to actuate said mechanism, and a locking mechanism actuated by said rod and engaging directly and positively with both rod and registering mechanism, and thereby preventing a second and independent operation of either said rod or said registering mechanism, substantially as described.

2. In a voting-machine, a compartment, a registering mechanism therein, a rod constructed to actuate said mechanism and a locking mechanism engaging directly with said mechanism; the said parts being constructed and arranged so that when said rod is operated to actuate said registering mechanism, said locking mechanism shall prevent further operation of said registering mechanism, and also prevent a second operation of said rod, substantially as described.

3. In a voting-machine, a compartment, a registering mechanism therein, a rod constructed to actuate said registering mechanism, a locking mechanism actuated by said rod and directly engaging both said rod and said registering mechanism, and means for releasing the said rod from said locking mechanism without releasing said registering mechanism therefrom, substantially as described.

4. In a voting-machine, a compartment, a registering mechanism therein, a rod for operating said registering mechanism from the exterior of said cell, and interposed between said rod and said mechanism a positive universal-joint connection permitting said rod to be independently rotated on its longitudinal axis, substantially as described.

5. In a voting-machine, a compartment, a shaft 7, therein two sliding sleeves, as 9 and 10 on said shaft closely abutting at their ends and provided with a recess, 14 a dog pivoted in said compartment and constructed to enter said recess, mechanism actuated by said dog, and means, outside of said compartment, for rotating said shaft 7, whereby said recess 14 may be moved into and out of position to receive said dog, substantially as described.

6. In a voting-machine, two movable dogs, indicating mechanisms actuated thereby, a block free to slide longitudinally, having in its end faces inclined or wedge-shaped recesses, and disposed transversely the path of movement of said dogs with said recesses normally in said path (the said dogs operating upon said block to move the same longitudinally) and means independently of said dogs, for moving said blocks in a direction transverse to that in which it is caused to slide by said dogs, substantially as described.

7. In a voting-machine, two movable dogs, indicating mechanisms actuated thereby, a shaft disposed transversely the path of movement of said dogs, a sleeve on said shaft and free to slide longitudinally thereon and having in its end faces inclined or wedge-shaped recesses in the path of said dogs, and means for rotating said shaft to move said recesses out of said path, substantially as described.

8. In a voting-machine, having a registering mechanism, two parallel shafts, 15* and 7 and pivoted on shaft 15* a ratchet provided with a pawl and actuating said mechanism and a dog having a sliding motion on said pivot provided with a pin 39 engaging with said ratchet and having its outer face or edge 19 bearing upon said shaft 7; the said parts being constructed and arranged so that, when said dog is depressed, its said face 19 shall bear against shaft 7, thus causing a sliding of said dog on its pivot 15* and the engagement of pin 39 with said ratchet, whereby said dog is locked between said pivot 15* and said shaft 7, substantially as described.

9. In a voting-machine, in combination with the supporting-frame A, and two or more detachable frames, 1 and 2, thereon, each of said frames 1 and 2 having compartments or cells, and in each compartment mechanism including a pivoted actuating-dog having a sliding motion on its pivot, a ratchet-wheel 33 on said pivot, a pin 39 on said dog, and a means of mechanically vibrating the said dog from the outside of the cell, mutilated shafts passing through all the compartments of each of said frames 1 and 2, with which shafts said dogs engage, pinions on the ends of said shafts, and a sliding rack in frame A engaging with said pinions; the said parts being constructed so that the movement of said rack shall rotate said shafts as and for the purpose described.

10. In a voting-machine, a pivoted dog 15, having a sliding movement on its pivot, pin 39 on said dog, a ratchet-wheel 33 on said pivot, indicating mechanism actuated by said dog, and a rotary shaft 7 provided with a projection 12; the said parts being constructed and arranged so that said shaft 7 may be turned to bring said projection 12 against said dog and thereby to move the same, whereby the pin 39 is caused to engage with the ratchet 33 to lock said dog in place, substantially as described.

SAUL ARONSON.

Witnesses:
M. BOSCH,
H. R. MOLLER.